United States Patent
Someya et al.

(10) Patent No.: US 9,668,224 B2
(45) Date of Patent: May 30, 2017

(54) RADIO BASE STATION APPARATUS, AND TRANSMISSION POWER DETERMINATION METHOD

(71) Applicant: NTT DOCOMO, INC., Tokyo (JP)

(72) Inventors: Takao Someya, Tokyo (JP); Atsushi Fukuda, Tokyo (JP); Hiroyuki Hosono, Tokyo (JP); Shogo Yabuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/908,559

(22) PCT Filed: Jul. 28, 2014

(86) PCT No.: PCT/JP2014/069835
§ 371 (c)(1),
(2) Date: Jan. 29, 2016

(87) PCT Pub. No.: WO2015/016183
PCT Pub. Date: Feb. 5, 2015

(65) Prior Publication Data
US 2016/0174166 A1      Jun. 16, 2016

(30) Foreign Application Priority Data

Aug. 1, 2013  (JP) .................................. 2013-160530

(51) Int. Cl.
*H04W 52/24*   (2009.01)
*H04J 11/00*   (2006.01)
(Continued)

(52) U.S. Cl.
CPC .......... *H04W 52/243* (2013.01); *H04J 11/00* (2013.01); *H04W 16/08* (2013.01); *H04W 52/18* (2013.01);
(Continued)

(58) Field of Classification Search
CPC ........ H04W 52/00–52/60; H04W 16/08; H04J 11/00
(Continued)

(56) References Cited

U.S. PATENT DOCUMENTS

| 7,701,911 B2 | 4/2010 | Soliman |
| 7,702,351 B2 | 4/2010 | Soliman |
| 8,620,303 B2 | 12/2013 | Hosono |

FOREIGN PATENT DOCUMENTS

| JP | 2007-251755 A | 9/2007 |
| JP | 2008-530959 A | 8/2008 |

(Continued)

OTHER PUBLICATIONS

Extended European Search Report issued in the countepart European Patent Application No. 14831983.3, mailed Jun. 1, 2016 (4 pages).

(Continued)

*Primary Examiner* — Raymond Dean
(74) *Attorney, Agent, or Firm* — Osha Liang LLP

(57) ABSTRACT

A radio base station apparatus including a function for determining a transmission power, including: a neighbor cell detection unit configured to detect a neighbor cell that interferes with a target cell that the radio base station apparatus can form; a received power measurement unit configured to measure, for each neighbor cell detected by the neighbor cell detection unit, a received power from the neighbor cell; and a transmission power determination unit configured to calculate, for each band part that overlaps with a transmission band of the radio base station apparatus in transmission bands of each neighbor cell, a sum of received powers for neighbor cells having transmission bands each including the band part, and to determine an interference amount in the target cell based on the sum of received (Continued)

powers so as to determine the transmission power by using the interference amount.

10 Claims, 11 Drawing Sheets

(51) Int. Cl.
  *H04W 16/08* (2009.01)
  *H04W 52/18* (2009.01)
  *H04W 52/14* (2009.01)
(52) U.S. Cl.
  CPC ....... *H04W 52/244* (2013.01); *H04W 52/245* (2013.01); *H04W 52/143* (2013.01)
(58) Field of Classification Search
  USPC .................................. 455/69, 522; 370/318
  See application file for complete search history.

(56) References Cited

FOREIGN PATENT DOCUMENTS

| | | |
|---|---|---|
| JP | 2011-24195 A | 2/2011 |
| JP | 2011-182009 A | 9/2011 |
| WO | 2010/038839 A1 | 4/2010 |

OTHER PUBLICATIONS

International Search Report issued in corresponding application No. PCT/JP2014/069835 mailed Oct. 28, 2014 (4 pages).
Written Opinion issued in corresponding application No. PCT/JP2014/069835 mailed Oct. 28, 2014 (4 pages).

| PROCEDURE | CONTROL SUMMARY |
|---|---|
| STEP 1 | (CONSIDER) DIVIDING OPERATING BAND BY EACH 5MHz<br><br>EXAMPLE OF 15MHz<br>\| DIVIDED BAND 1 \| DIVIDED BAND 2 \| DIVIDED BAND 3 \| |
| STEP 2 | MEASURE INTERFERENCE AMOUNT FOR EACH 5MHz<br><br>MEASURE INTERFERENCE LEVEL FOR EACH 5MHz<br>NEIGHBOR CELL #1 (LTE10MHz) → $\alpha + \beta + \gamma$, $\alpha + \beta$<br>+<br>NEIGHBOR CELL #2 (LTE15MHz) → $\alpha$, $\beta$<br>+<br>NEIGHBOR CELL #3 (3G CARRIER) → $\gamma$ |
| STEP 3 | REGARD LARGEST INTERFERENCE POWER IN A PLURALITY OF DIVIDED BANDS TO BE INTERFERENCE AMOUNT OF TARGET CELL SO AS TO DETERMINE TRANSMISSION POWER |

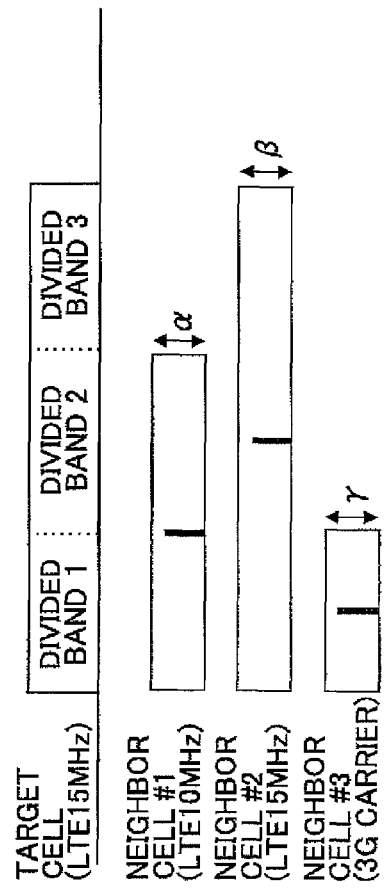

(a)

(b) COMMUNICATION SCHEME

WEIGHTING COEFFICIENT OF LTE :A
WEIGHTING COEFFICIENT OF 3G :B

DIVIDED BAND 1 :$(\alpha+\beta)/A+\gamma/B$
DIVIDED BAND 2 :$(\alpha+\beta)/A$
DIVIDED BAND 3 :$\beta/A$ (c) FREQUENCY WEIGHTING FOR DIVIDED BAND 1:X
WEIGHTING FOR DIVIDED BAND 2:Y
WEIGHTING FOR DIVIDED BAND 3:Z DIVIDED BAND 1 :$(\alpha+\beta+\gamma)/X$
DIVIDED BAND 2 :$(\alpha+\beta)/Y$
DIVIDED BAND 3 :$\beta/Z$

RADIO BASE STATION APPARATUS, AND TRANSMISSION POWER DETERMINATION METHOD

TECHNICAL FIELD

The present invention relates to a base station apparatus in a mobile communication system. More particularly, the present invention relates to a technique for determining a transmission power in the base station apparatus.

BACKGROUND ART

There is a case in which a femto base station apparatus is placed in a macro cell in order to improve radio quality in a narrow area such as in a home and the like, or to distribute traffic of the macro cell.

In femto base station apparatuses, there is a type of femto base station apparatus which is provided with a function of radio plug and play (radio PnP) in which the femto base station apparatus monitors surrounding radio wave environment and automatically sets a radio related parameter for realizing an easy setup method.

According to the radio PnP function, for example, only by turning on the femto base station apparatus, the femto base station apparatus automatically sets and adjusts various parameters, related to radio, depending on placement situation and the like. Thus, it becomes unnecessary to perform radio wave measurement and to set various parameters based on the radio wave measurement result that were necessary in the conventional technique. Thus, operation can be started more easily.

RELATED ART DOCUMENT

Patent Document

[PATENT DOCUMENT 1] JP2011-024195

SUMMARY OF THE INVENTION

Problem to be Solved by the Invention

As the above-mentioned radio PnP functions, there is a function for determining whether a signal is transmitted from any of neighbor macro base station apparatuses so as to detect an identifying parameter and to make settings which are different from those of the neighbor macro base station apparatuses, and there is a function for measuring radio wave strength (interference) from a neighbor macro base station apparatus so as to set transmission power of the femto base station apparatus from the interference amount, and the like.

Currently, as a communication scheme of the mobile communication, in addition to the legacy 3G, LTE is widespread. Thus, femto base station apparatuses supporting both of 3G and LTE are appearing.

The bandwidth of the transmission band that can be used for radio communication of LTE is wider than that of the transmission band used for radio communication of 3G. Also, as for LTE, there is a case in which the bandwidth of the transmission band is different for each cell. That is, as to a femto base station apparatus supporting LTE, a case occurs in which there are one or a plurality of neighbor cells operated using a transmission band having a bandwidth narrower than that of a transmission band of itself.

In such a case, it is considered that an interference amount from a neighbor cell is different for each part of the transmission band of the femto base station apparatus. Thus, for example, it is difficult to obtain proper transmission power for causing a mobile terminal to be located in a cell of the femto base station apparatus based on an average interference amount over the transmission band of the femto base station apparatus.

In the above-mentioned radio environment, there has been no conventional radio PnP technique for automatically determining proper transmission power.

The present invention is contrived in view of the above-mentioned points, and an object of the present invention is to provide a technique that enables a radio base station apparatus to properly determine a transmission power even when there is a neighbor cell that is operated using a transmission band of a bandwidth narrower than a transmission bandwidth of the radio base station apparatus.

Means for Solving the Problem

For solving the problem, according to an embodiment of the present invention, there is provided a radio base station apparatus including a function for determining a transmission power, including:

a neighbor cell detection unit configured to detect a neighbor cell that interferes with a target cell that the radio base station apparatus can form;

a received power measurement unit configured to measure, for each neighbor cell detected by the neighbor cell detection unit, a received power from the neighbor cell; and a transmission power determination unit configured to calculate, for each band part that overlaps with a transmission band of the radio base station apparatus in transmission bands of each neighbor cell, a sum of received powers for neighbor cells having transmission bands each including the band part, and to determine an interference amount in the target cell based on the sum of received powers so as to determine the transmission power by using the interference amount.

The transmission power determination unit, for example, regards the largest value in sums of received powers calculated for each band part to be the interference amount in the target cell, and determines the transmission power by using the interference amount.

Effect of the Present Invention

According to an embodiment of the present invention, there is provided a technique that enables a radio base station apparatus to properly determine a transmission power even when there is a neighbor cell that is operated using a transmission band of a bandwidth narrower than a transmission bandwidth of the radio base station apparatus.

BRIEF DESCRIPTION OF THE DRAWINGS

FIG. 3 is a diagram showing an outline example of transmission power determination processes performed by the small base station apparatus 100;

FIG. 9 is a diagram for explaining a modified example 2;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

For example, although a case where there are 3G and LTE as communication schemes is explained as an example in the following embodiment, the communication scheme is not limited to these. Also, although it is assumed that the small base station apparatus 100 described in the following embodiment is a femto base station apparatus including a radio PnP function, the small base station apparatus 100 is not limited to such a femto base station apparatus. Also, although the small base station apparatus 100 is an example of a radio base station apparatus of the present invention, application of the transmission power determination technique of the radio base station apparatus of the present invention is not limited to the small base station apparatus. For example, the technique can be also applied to other types of base station apparatuses (macro base station and the like).

Also, in the following example, although macro cells are explained as an example of a neighbor cell, the neighbor cell may be a cell of another small base station apparatus and the like.

(First Embodiment)
<System Whole Configuration Example>

Figure 1:
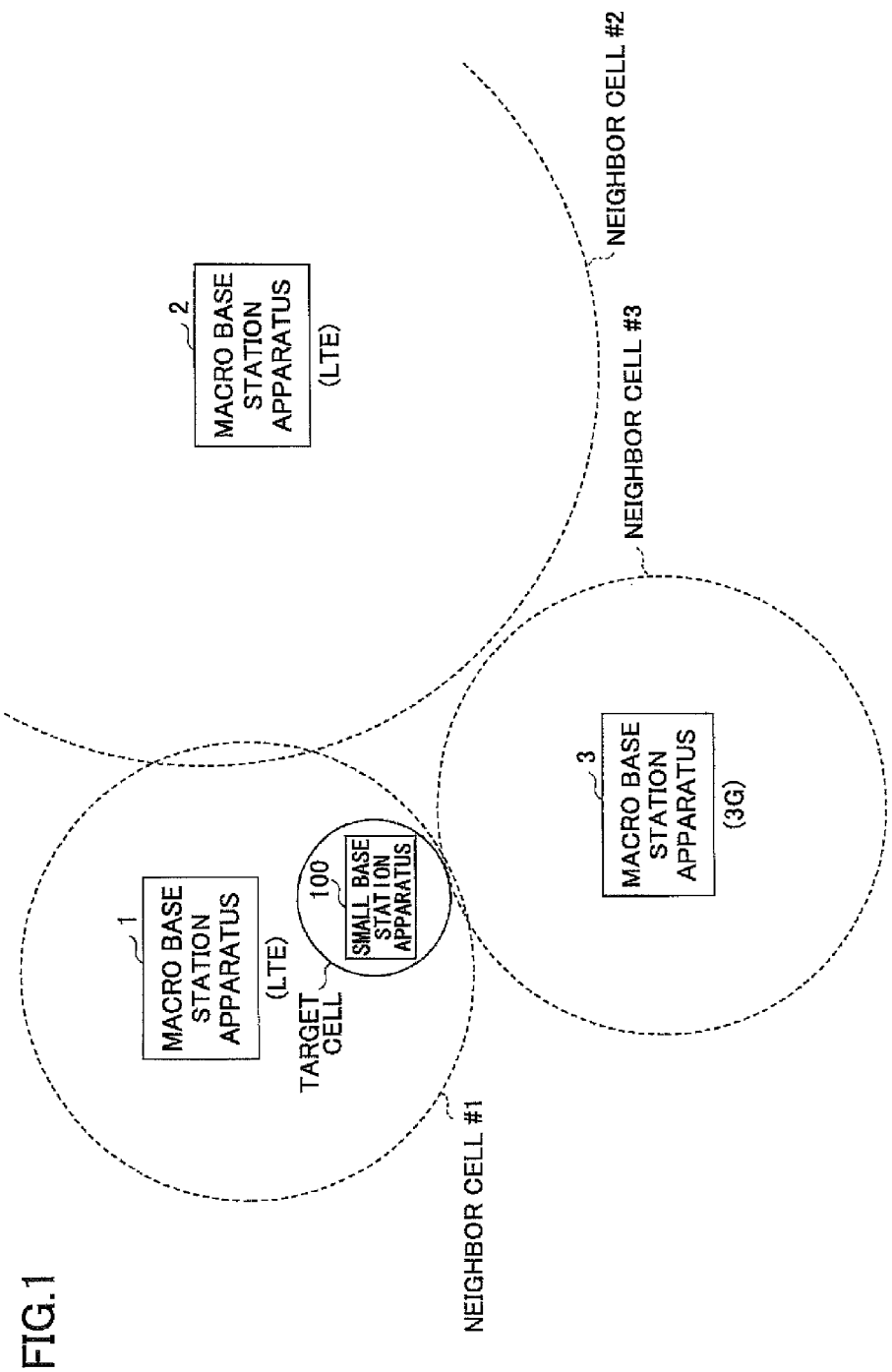
FIG. 1 is a diagram showing a whole configuration example of a mobile communication system in an embodiment of the present invention.

FIG. 1 shows a whole configuration example of a mobile communication system of the present embodiment. As shown in FIG. 1, in the mobile communication system, the small base station apparatus 100 of the present embodiment is placed in an environment in which there are macro base station apparatuses 1, 2 and 3 around the small base station apparatus 100. In the example shown in FIG. 1, cells formed by the macro base station apparatuses 1, 2 and 3 are shown by dotted lines, the cell (to be referred to as "target cell" hereinafter) formed by the small base station apparatus 100 of the present embodiment is shown by a solid line. As shown in FIG. 1, for the small base station apparatus 100, the macro base station apparatus 1 forms a neighbor cell #1, the macro base station apparatus 2 forms a neighbor cell #2, and the macro base station apparatus 3 forms a neighbor cell #3.

Also, the small base station apparatus 100 is connected to a core network of a mobile communication network by a communication circuit (example: broadband circuit). Further, the small base station apparatus 100 can obtain information such as the number of terminal connections and the like from another base station apparatus via the core network or by direct communication between base stations (example: communication via X2 interface).

As shown in FIG. 1, the macro base station apparatus 1 supports LTE, the macro base station apparatus 2 supports LTE, and the macro base station apparatus 3 supports 3G. Although the small base station apparatus 100 supports both of 3G and LTE, it is not essential to support both of 3G and LTE in the embodiment of the present invention, and the small base station apparatus 100 may be an apparatus that supports only LTE. The embodiment of the present invention is mainly related to transmission power setting in LTE side of the small base station 100. Transmission power setting in the 3G side can be performed using a conventional technique. However, for example, in a case where it is assumed that there is a neighbor base station that is operated by a system bandwidth narrower than the system bandwidth (5 MHz) of 3G, it is possible to perform transmission power setting in 3G side by using the technique of the present invention.

The transmission frequency bandwidth (transmission frequency bandwidth is to be referred to as "bandwidth" hereinafter, this may be described as "system bandwidth") used in a base station apparatus of 3G is narrower than a bandwidth used in LTE. In the example shown in FIG. 1, the macro base station apparatus 1 uses 10 MHz of LTE, the macro base station apparatus 2 uses 15 MHz of LTE, and the macro base station apparatus 3 uses 5 MHz of 3G. The bandwidth of LTE of the small base station apparatus 100 is 15 MHz.

<Transmission Power Setting Operation Outline>

Operation outline of transmission power setting of the small base station apparatus 100 in the present embodiment in the above-mentioned precondition is described with reference to FIG. 2 and FIG. 3. This operation is performed, for example, after the small base station apparatus 100 is turned on, or it is performed periodically and automatically during operation.

Figure 2:
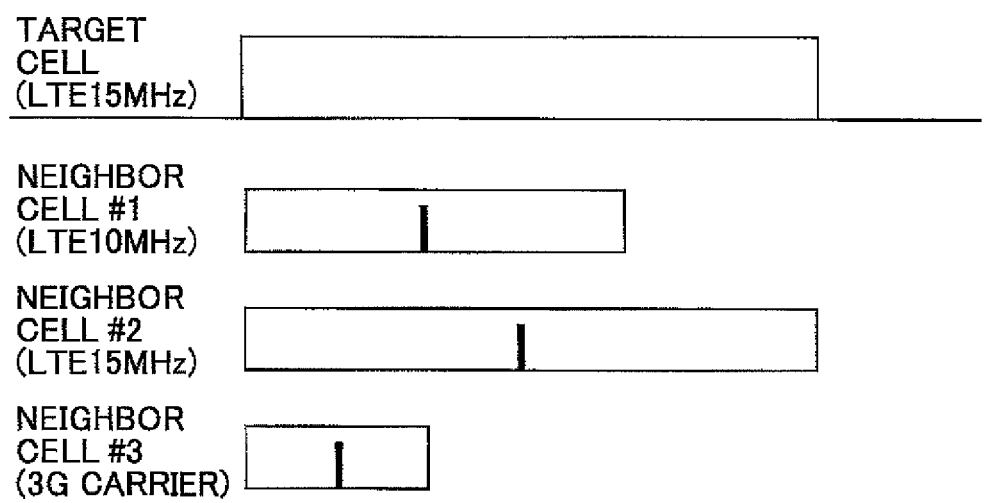
FIG. 2 is a diagram showing a state of radio wave in an environment shown in FIG. 1.

In the present embodiment, since the small base station apparatus 100 is placed in an environment shown in FIG. 1, bands (transmission bands) of radio wave of neighbor cells for the small base station apparatus 100 are as shown in FIG. 2. FIG. 2 also shows a band of the small base station apparatus 100.

Based on the premise shown in FIG. 2, first, the small base station apparatus 100 performs cell search so as to detect a communication scheme and a band for each neighbor cell shown in FIG. 2.

In the present example, as shown in FIG. 2, bands of each neighbor cell and the target cell align at the left end of the frequency position, and each bandwidth is a multiple of 5 MHz of 3G which is the smallest bandwidth. Thus, as shown in FIG. 3, the small base station apparatus 100 considers to divide the band of itself every 5 MHz (step 1), and calculates an interference power (interference amount) for each divided band (step 2). More specifically, the small base station apparatus 100 measures received power for each neighbor cell, adds received powers for each overlapping band part, and sets the result to be an interference power for each band. In the present embodiment, basically, it is assumed that a transmission power of a base station is constant over the whole transmission band.

In the example shown in FIG. 3, the received power from the neighbor cell #1 (macro base station apparatus 1) is $\alpha$, the received power from the neighbor cell #2 (macro base station apparatus 2) is $\beta$, and the received power from the neighbor cell #3 (macro base station apparatus 3) is $\gamma$. In the divided band 1, bands of neighbor cells #1-#3 overlap with the band of the small base station apparatus 100, in the divided band 2, bands of neighbor cells #1 and #2 overlap with the band of the small base station apparatus 100, and in the divided band 3, only band of neighbor cell #3 overlaps with the band of the small base station apparatus 100. Therefore, as shown in FIG. 3, the interference power of the divided band 1 (sum of received powers from neighbor cells) becomes $\alpha+\beta+\gamma$, the interference power of the divided band 2 becomes $\alpha+\beta$, and the interference power of the divided band 3 becomes $\gamma$.

After obtaining the interference power for each divided band, the small base station apparatus 100 regards the greatest value in the interference powers of the plurality of divided bands to be the interference power (interference amount) of the target cell of the small base station apparatus 100, and determines a transmission power of itself based on the interference power (step 3). It is an existing technique itself to determine a transmission power of a base station for obtaining desired reception quality in a state where interference of a size of interference power is received.

In the example of the radio wave environment shown in FIG. 2, since $\alpha+\beta+\gamma$ is the largest, for example, the transmission power is calculated as "transmission power"=$\alpha+\beta+\gamma$+"offset value". The offset value is a value determined based on a size of the cell to be desired to form, a desired reception quality and the like, for example.

Basically, the mobile terminal performs operation for determining a cell to be located in based on a size of a received power of radio wave from the base station. Thus, as mentioned above, by regarding the largest value in the interference powers of the plurality of divided bands to be the interference power for the target cell so as to determine the transmission power of itself based on the interference power, it becomes possible to cause a mobile terminal whose interference amount from neighbor cells is the largest to be located in a target cell. Thus, the target cell can be properly formed.

In the following, the present embodiment is described in more detail.

<Apparatus Configuration>

Figure 4:
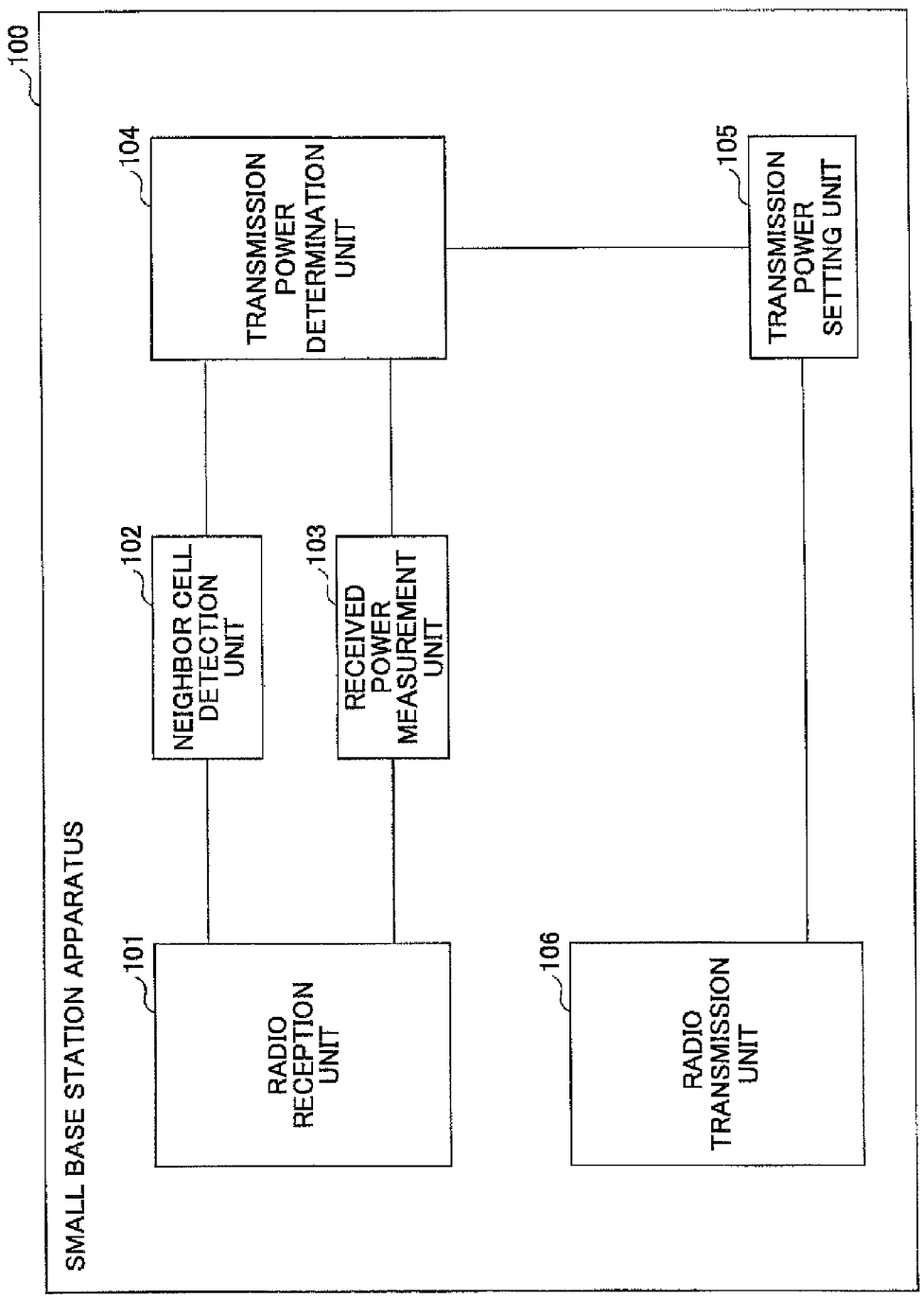
FIG. 4 is a functional block diagram of the small base station apparatus 100.

FIG. 4 shows a functional block diagram of the small base station apparatus 100 in the present embodiment. As shown in FIG. 4, the small base station apparatus 100 includes a radio reception unit 101, a neighbor cell detection unit 102, a received power measurement unit 103, a transmission power determination unit 104, a transmission power setting unit 105 and a radio transmission unit 106. The configuration of FIG. 4 (also applies to configurations of other figures) shows only configurations that are related to automatic transmission power setting using the technique of the present invention in the small base station apparatus 100 The small base station apparatus 100 includes existing functions, not shown in the figure, for operating as a base station apparatus.

The radio reception unit 101 is a functional unit configured to receive a radio signal (radio wave). The radio transmission unit 106 is a functional unit configured to transmit a radio signal. The small base station apparatus 100 of the present embodiment supports a plurality of communication schemes (3G and LTE and the like), and the radio reception unit 101 has a reception function for each communication scheme so that it can perform after-mentioned cell detection, received power measurement and the like for each communication scheme. Also, the radio transmission unit 106 includes a transmission function for each communication scheme. In the present embodiment, although 3G and LTE are assumed for the plurality of radio communication schemes, the communication schemes are not limited to these.

The neighbor cell detection unit 102 is a functional unit configured to perform cell search for each communication scheme, to detect a neighbor cell, and to detect a band (center frequency and bandwidth, and the like) used in downlink communication in the neighbor cell.

The received power measurement unit 103 measures (calculates) a received power for each neighbor cell detected by the neighbor cell detection unit 102 based on a reference signal or a pilot signal or the like received from the neighbor cell by the radio reception unit 101. As examples of received powers measured by the received power measurement unit 103, there are RSRP, CPICH, RSCP and the like.

The transmission power determination unit 104 is a functional unit configured to determine transmission power based on the received power (interference power) for each neighbor cell obtained by the received power measurement unit 103. Also, the transmission power determination unit 104 includes a function configured to cause the neighbor cell detection unit 102, and the received power measurement unit 103 and the like to perform operation. The transmission power setting unit 105 is a functional unit configured to set the transmission power determined by the transmission power determination unit 104 in the radio transmission unit 106. The radio transmission unit 106 performs transmission of a radio signal by the set transmission power.

In the present embodiment, the transmission power determination unit 104 determines and sets a transmission power on LTE. As for 3G, a transmission power is determined and set by an existing technique. However, also as to 3G, in a case where, for example, there is a neighbor cell using a bandwidth narrower than that of 3G, the transmission power setting technique described in the present embodiment can be used.

In the following, a basic example, and modified examples 1 and 2 are described on transmission power setting of the small base station apparatus 100 having the above-mentioned basic configuration. In the basic example, and modified examples 1 and 2, the basic example is an operation example which is the most basic. As to modified examples 1 and 2, differences from the basic example are mainly described. Also, modified examples 1 and 2 may be combined and carried out.

<Basic Example>

Figure 5:
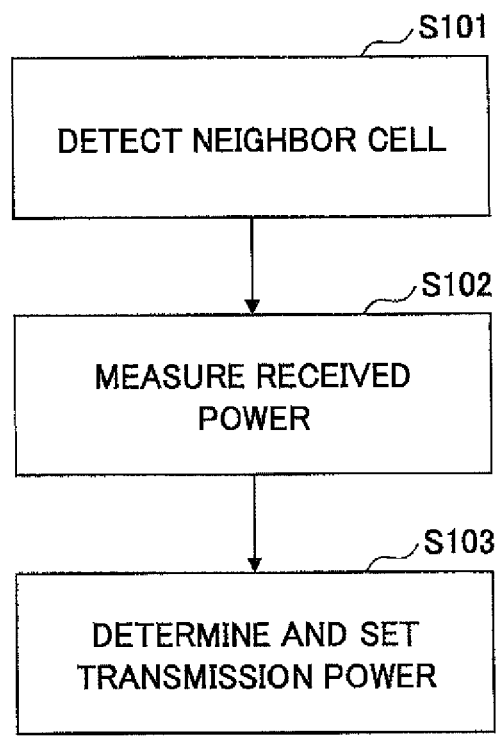
FIG. 5 is a flowchart showing a procedure example on transmission power setting of the small base station apparatus 100.

The basic example is described along the procedure of the flowchart of FIG. 5.

[Step 101: Neighbor Cell Detection]

After the small base station apparatus 100 is connected to a predetermined communication circuit (example: broadband circuit), and the power is turned on, the neighbor cell detection unit 102 performs cell search (detection of cell). Cell search is performed for each of communication schemes. In both of the communication schemes (3G, LTE) assumed in the present embodiment, the neighbor cell detection unit 102 performs processes of receiving a synchronization signal, and receiving necessary information (bandwidth and the like in LTE) for performing communication in the cell after establishing frame synchronization and the like. Especially, in LTE, since the synchronization signal is transmitted in a band (frequency) of a center part of the system bandwidth, the neighbor cell detection unit 102 performs search (detection of synchronization signal) by measuring a band that may correspond to the band of the center part. Also in 3G, the neighbor cell detection unit 102 performs search in the same way as LTE in that it measures a band (frequency) where a synchronization signal may be transmitted.

Figure 6:
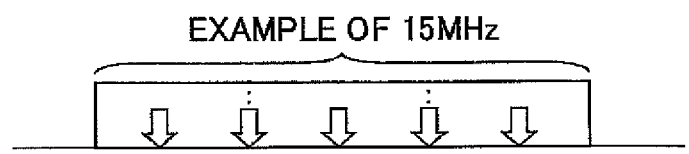
FIG. 6 is a diagram showing an example of measurement points in detection of a neighbor cell.

In the present embodiment, the environment shown in FIGS. 1 and 2 is used as a premise, thus, the bandwidth of the small base station apparatus 100 is 15 MHz, and the smallest bandwidth of the neighbor cell is 5 MHz. Then, it is assumed that frequency points (to be referred to as measurement points) where there can be a center of a band of a neighbor cell that overlaps, at least partially, with the transmission band of the small base station apparatus 100 are known beforehand to be 5 points arranged at intervals of 2.5 MHz as shown in FIG. 6. That is, the information of the points is stored beforehand in a storage unit of the neighbor cell detection unit 102. The information of the points may be obtained from the outside (example: core network), and the obtained information may be utilized.

In this case, for each of the 5 points shown in FIG. 6, detection of synchronization signal is performed in a predetermined band centered on the frequency of the point, so that detection of neighbor cell is performed. The detection process is performed for each communication scheme. However, for example, in a case where it is known that a synchronization signal is detected only in a band of a particular point if there is a neighbor cell of a communication scheme (example: 3G), it is only necessary to perform detection only for the point as for the communication scheme.

Basically, neighbor cell detection is performed for a plurality of points for each communication scheme. However, for the sake of the explanation to be easily understood, the measurement point for 3G is fixed, and search for a plurality of points is performed for LTE in the present embodiment.

As neighbor cells, in a case where there is a possibility that there are not only neighbor cells of bandwidths of natural number times of 5 MHz as shown in FIG. 2, but also neighbor cells of bandwidth of 1.4 MHz of LTE, for example, the number of points where there may be a center of a band of a neighbor cell that overlaps the transmission band of itself becomes very large.

In such a case, although it can be considered to increase the number of measurement points, it is not preferable as a radio PnP function since measurement time increases. As the radio PnP function, it is desirable that operation starts as quickly as possible when the power of the apparatus is turned on. Therefore, in the present embodiment, the number of measurement points can be restricted as explained below as examples (1)-(5). That is, it is possible to perform search by using a number of measurements points less than an assumed number of measurement points. The following restriction of the number of measurement points may be also performed in the case shown in FIG. 6. Also, two or three or four or five of the following examples (1)-(5) may be combined and carried out.

(1) A threshold of the number of measurement points is provided, the threshold is stored in a storage unit of the neighbor cell detection unit 102. The neighbor cell detection unit 102 performs detection of a synchronization signal of measurement points at wide intervals first, then, performs detection by gradually narrowing the interval. The threshold of the number of measurement points may be obtained from the outside (example: core network), and the obtained threshold may be utilized. The neighbor cell detection unit 102 counts the number of measured points, and ends measurement when the number of measured points reaches the threshold.

As an example, the threshold is greater than 5, and in the example shown in FIG. 6, measurement is performed for 5 points shown in FIG. 6, first. Next, for example, as for measurement points when existence of a neighbor cell of 1.4 MHz bandwidth of LTE is assumed, measurement is performed over the whole 15 MHz at interval B that is greater than 0.7 MHz (such that the number of points does not become large). Next, measurement is performed at interval less than B. Such a process is performed within a range where the number of measured points does not exceed the threshold.

(2) A threshold may be provided for a number of detected neighbor cells. In general, the number of neighbor cells that actually become interference for the cell that is formed by the small base station apparatus 100 is not large. Therefore, in this example, a threshold of the number of detected neighbor cells is predetermined, and the threshold is set in the storage unit of the neighbor cell detection unit 102. The neighbor cell detection unit 102 ends the neighbor cell detection process at a time point when neighbor cells of the number of the threshold are detected.

(3) A threshold may be provided for an interference amount of neighbor cell. When the small base station apparatus 100 is a femto base station apparatus which is assumed in the present embodiment, it is generally placed within a macro cell. Then, it can be considered that interference from the macro cell becomes a dominant interference amount for the small base station apparatus 100, and effects of other neighbor cells as interference are small. Therefore, in this example, the neighbor cell detection unit 102 ends neighbor cell detection when it detects a neighbor cell for which received power that is equal to or greater than a predetermined value, that is predetermined as a value corresponding to an interference amount from the macro cell, is measured. In this example, each time when the neighbor cell detection unit 102 detects a neighbor cell, the received power measurement unit 103 measures received power for the neighbor cell.

(4) The number of measurement points may be changed according to a timing for performing transmission power setting. For example, when starting up the small base station apparatus 100 (when the power is turned ON), the number of measurement points is set to be small, and after the start-up (in operation), all of the assumed measurement points are measured. By the way, during the operation, for example, the transmission power setting is performed at predetermined time intervals. The above-mentioned process is performed since it is necessary to make the small base station apparatus 100 to be in an operation state as quickly as possible when starting up the small base station apparatus 100.

(5) A threshold (example: 100 seconds) of a time period for performing search of neighbor cells may be determined, in which the neighbor cell detection unit 102 may end search at a time point when a time period of the threshold elapses from the time point of start of search, then, transmission power setting may be performed based on neighbor cells detected at the time point of the end of search. In this case for example, the neighbor cell detection unit 102 includes a timer which sets the time of the threshold. The neighbor cell detection unit 102 starts the timer at the time point of start of search, and ends the search when the timer expires. The time of the threshold may be stored in the storage unit of the small base station apparatus 100 beforehand, or may be obtained from the outside (example: core network).

When the neighbor cell detection unit 102 detects a neighbor cell, the neighbor cell detection unit 102 obtains a bandwidth and the like used in the neighbor cell by broadcast information (MIB and the like) and the like received from the neighbor cell. By the way, as to 3G, a fixed bandwidth (5 MHz) may be used.

[Step 102: Received Power Measurement]

Next, the received power measurement unit 103 measures a received power for each neighbor cell detected in step 101. Although there is no particular limitation for the measurement method of the received power, for example, the received power can be calculated by calculating an average value over the whole band of received power of reference signals (reference signal, pilot signal) transmitted over the whole system band.

[Step 103: Transmission Power Determination, Setting]

Next, the transmission power determination unit 104 determines transmission power of itself (the small base station apparatus 100) based on the received power for each neighbor cell calculated in step 102.

The transmission power determination unit 104 obtains a sum of received powers for each band part of a band which overlaps with a target cell band, and regards the largest value in the sums to be an interference power (interference amount) of the target cell.

For example, in a neighbor cell environment as described in FIGS. 2 and 3, three kinds of sums of $\alpha+\beta+\gamma$, $\alpha+\beta$ and $\gamma$ are calculated. In these values, since $\alpha+\beta+\gamma$ is the largest, this is regarded as the interference power. In the case of the neighbor cell environment as described in FIGS. 2 and 3, the above-mentioned "band part" is each of divided band 1, divided band 2 and divided band 3. That is, the transmission power determination unit 104 calculates, for each of band parts (divided band 1, divided band 2 and divided band 3) that overlaps with transmission band of the small base station apparatus 100 in transmission band of each frequency cell, a sum of received powers of neighbor cells having transmission band including the band part, obtains an interference amount in the target cell based on the sum of the weighted received powers, and determines the transmission power based on the interference amount. The above-mentioned "received power of a neighbor cell having transmission band including the band part" is $\alpha$ and $\beta$ when the band part is the divided band 2, for example.

It is desirable that the size of the width of "band part", that is, a unit of band division is the same as or less than the smallest bandwidth in bandwidths of neighbor cells.

Figure 7:
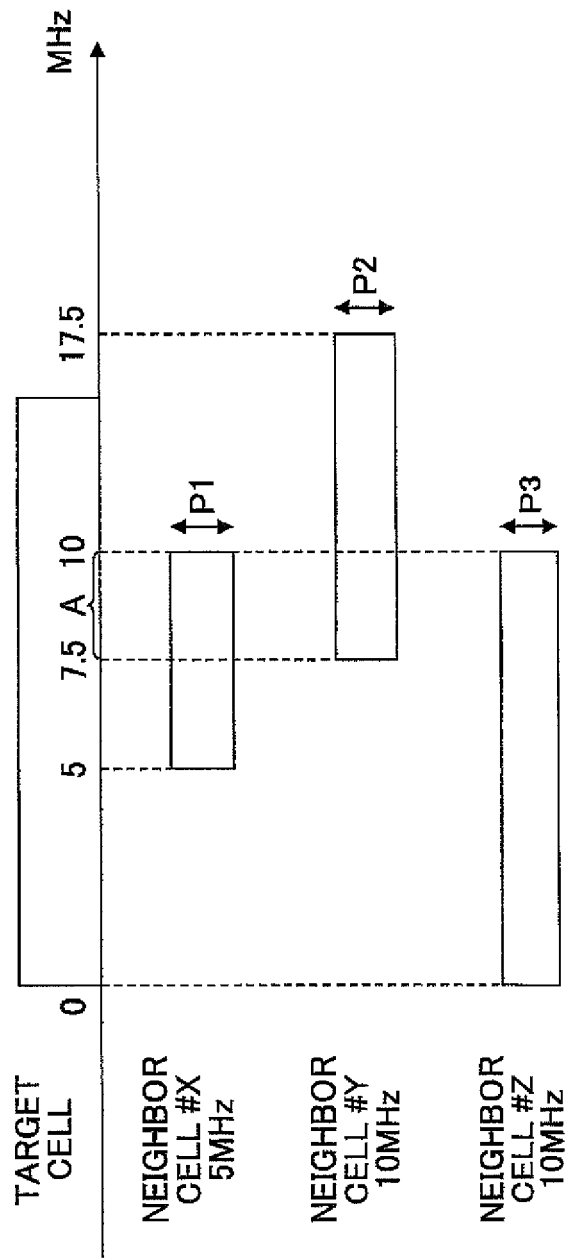
FIG. 7 is a diagram showing another example of neighbor cell radio environment in the basic example.

Also, for example, it is assumed that bands of neighbor cells are detected as shown in FIG. 7 and that received powers of the neighbor cells are P1, P2 and P3 respectively as shown in the figure. In FIG. 7, in the frequency axis, the left end of band of the target cell is 0, and frequency positions of ends of bands of each neighbor cell are shown. In the example shown in FIG. 7, the band part shown as A is the largest, and the power becomes P1+P2+P3, and this value is regarded as an interference power.

The transmission power determination unit 104 determines a transmission power by adding an offset value to the interference power obtained as mentioned above. Then, the transmission power setting unit 105 sets the transmission power determined by the transmission power determination unit 104 to the radio transmission unit 106. Like this example, in a case where an end of a band of a neighbor cell is placed within (example: in a center of) a band of another neighbor cell, it is preferable that the size of the width of "band part" is less than the smallest bandwidth in bandwidths of neighbor cells. In the example of FIG. 7, it is preferable that the size of the width of "band part" is a half (2.5 MHz) of the smallest bandwidth (5 MHz) in bandwidths of neighbor cells.

In the basic example, like $\alpha+\beta+\gamma$ of FIG. 3, the largest value of sums of parts where bands overlap is regarded as the interference power. Instead of determining the transmission power of itself to conform to the largest value, a transmission power suitable for interference may be obtained for each band by performing boosting appropriate for interference of each band. For example, in the example of FIG. 3, it is considered that, a transmission power of the divided band 1 is set based on $\alpha+\beta+\gamma$, a transmission power of the divided band 2 is set based on $\alpha+\beta$, and a transmission power of the divided band 3 is set based on $\gamma$.

<Modified Example 1>

In the basic example, the largest value of sums of parts where bands overlap is regarded as the interference power. Accordingly, even a mobile terminal that receives the largest interference can be accommodated in a target cell of the small base station apparatus 100.

However, in the basic example, since the largest value of sums of parts where bands overlap is regarded as interference power over the whole band of the target cell, it can be considered that, for a mobile terminal of a neighbor cell that uses a band including a band which is not a band that receives the largest interference, the transmission power becomes an excessive transmission power. For example, in the example shown in FIG. 3, in a case where the transmission band is calculated by regarding the largest value of the sums to be the interference power, for a mobile terminal of a neighbor cell that uses divided bands 1+2, the transmission power becomes excessive for causing the mobile terminal to transit to the target cell, so that there is a possibility that the target cell expands too widely towards the neighbor cell that uses the divided bands 1+2 (exerting interference). In such a case, for example, many mobile terminals move to the target cell from the neighbor cell that uses the divided bands 1+2, so that the number of terminals accommodated in the target cell becomes too large, and there is a possibility that the number of terminals exceeds process capability.

In the modified example 1, in consideration of such a possibility, the transmission power determination unit 104 determines a value that is regarded as the interference power based on the number of mobile terminals connecting to the target cell (example: UE of RRC connected state).

Figure 8:
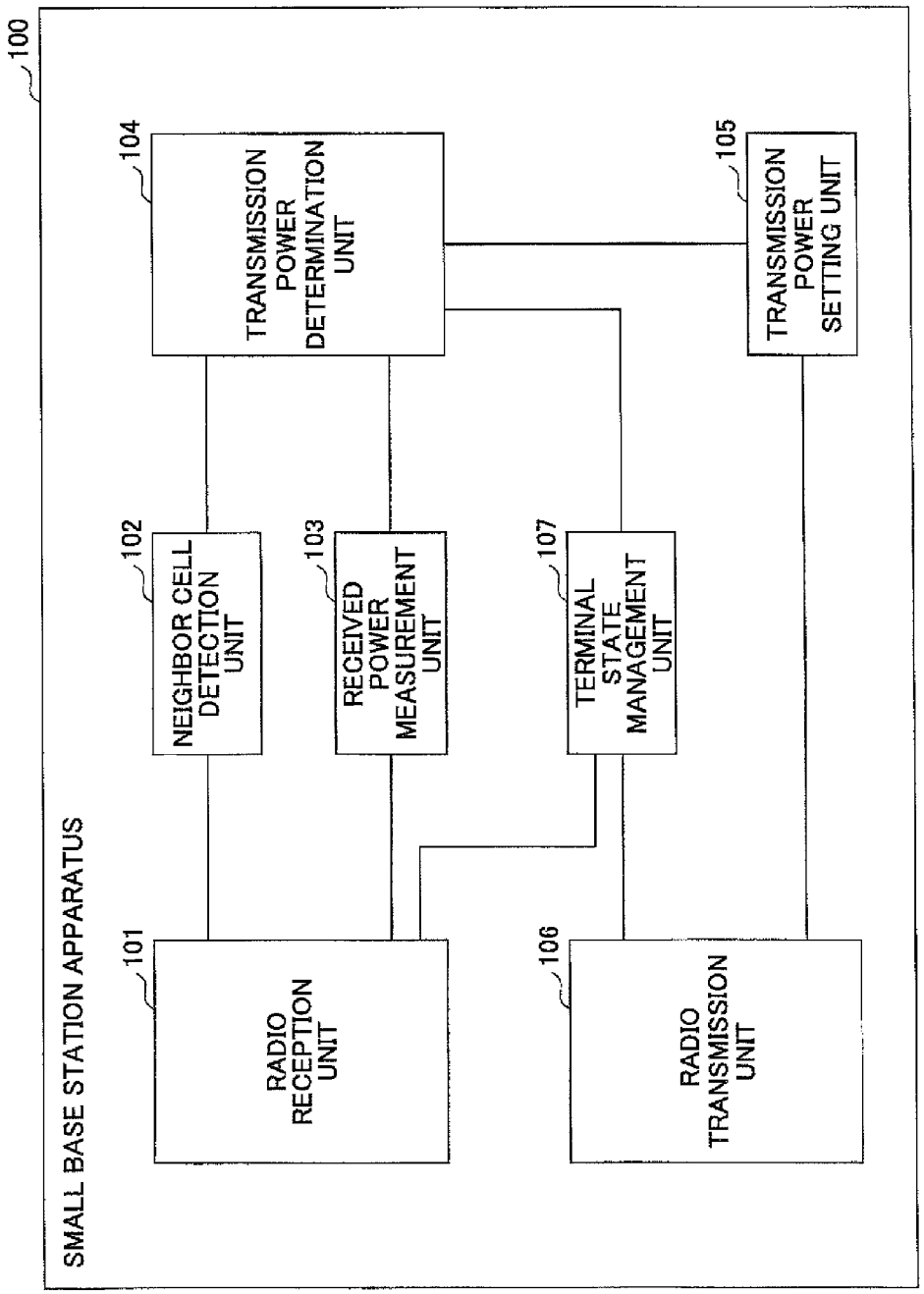
FIG. 8 is a functional block diagram of the small base station apparatus 100 in a modified example 1.

FIG. 8 shows a functional block diagram, of the small base station apparatus 100 in the modified example 1. As shown in FIG. 8, this configuration is different from that shown in FIG. 4 in that a terminal state management unit 107 is provided. The terminal state management unit 107 includes a storage unit for storing information indicating state of whether, for each mobile terminal, the mobile terminal is RRC connected or not, so that the transmission power determination unit 104 can calculate the number of mobile terminals connected to the target cell by referring to the storage unit.

Assuming the environment shown in FIG. 3, as an example, the transmission power determination unit 104 holds a threshold 1 and a threshold 2 on connected terminals (threshold 1>threshold 2).

When the small base station apparatus 100 is starting up, the small base station apparatus 100 uses the largest value ($\alpha+\beta+\gamma$) for an interference power for determining a transmission power. Then, during the operation, the small base station apparatus 100 adjusts the value to be regarded as the interference power according to the number of connecting terminals. Also in this example, the small base station apparatus 100 performs detection of neighbor cells, and measurement of received power for each neighbor cell. For the sake of easy understanding of the explanation, it is assumed that the received power from neighbor cells that becomes interference for each measurement is as shown in FIG. 3.

During the operation, for each predetermined time (it may be or may not be at the same time as operation of neighbor cell detection and measurement), the transmission power determination unit 104 obtains the number of connecting terminals by referring to the terminal state management unit 107, and compares the number of connecting terminals with the thresholds. As a result of comparison, when "the number of connecting terminals<threshold 2" holds true, since the number of connecting terminals is sufficiently small, the transmission power determination unit 104 performs transmission power determination using the largest value ($\alpha+\beta+\gamma$). As a result of comparison, when "threshold 1>the number of connecting terminals≥threshold 2" holds true, since the number of connecting terminals is slightly large, the transmission power determination unit 104 uses $\alpha+\beta$ as received power for determining the transmission power for decreasing the transmission power a little, and determines the transmission power based on this. Accordingly, it can be considered that a mobile terminal, at a cell edge, that actually receives interference of $\alpha+\beta+\gamma$ becomes out of the range of the target cell.

Then, as a result of comparison, when "the number of connecting terminals≥threshold 1" holds true, the transmission power determination unit 104 uses $\beta$ as received power for determining the transmission power for further decreasing the transmission power. Accordingly, it can be considered that a mobile terminal, at a cell edge, that actually receives interference of $\alpha+\beta+\gamma$, and a mobile terminal, at a cell edge, that actually receives interference of $\alpha+\beta$ become out of the range of the target cell. In a case where, for example, the number of mobile terminals existing in the neighbor cell #2 of a band corresponding to $\beta$ is very large, it can be considered that, even if $\beta$ is used as the receive power for determining the transmission power, the state of "the number of connecting terminals≥threshold 1" continues. In such a case, the transmission power may be further decreased.

As mentioned above, in the present embodiment, the transmission power determination unit 104 obtains the number of connecting terminals, and selects, based on the number of the connecting terminals, a value to be used as the interference amount in the target cell from among sums of received powers calculated for each band part so as to determine the transmission power by using the value. Accordingly, a proper transmission power can be set according to the number of connecting terminals.

<Modified Example 2>

In examples described so far, although a sum of received powers of bands of detected neighbor cells is regarded as an interference power, the received powers may be weighted and added. For example, in a case where it is known that the number of connecting terminals or traffic is regularly large in an LTE station in neighbor macro base station apparatuses, the received power of the band of LTE is weighted and added such that the received power is exaggerated (weighting by communication scheme).

For example, in an example shown in FIG. 9(a) which is similar to the example shown in FIG. 3, as shown in FIG. 9(b), the transmission power determination unit 104 uses A(1/A) as a weighting coefficient for LTE, and uses B(1/B) as a weighting coefficient for 3G to perform weighting for each communication scheme and adding. The weighting coefficient may be set beforehand by the transmission power determination unit 104, or may be obtained from the outside (example: core network) so as to utilize the obtained weighting coefficient.

Since this case corresponds to the case where the number of users/traffic is regularly large in the LTE stations of the neighbor macro base station apparatuses, A is set to be small such that LTE interference is exaggerated. For example, B is set to be 1, and A is set to be a number less than 1. Accordingly, in a case where there is a neighbor LTE station, the transmission power of the small base station apparatus 100 can be made large, so that mobile terminals that are caused to move to the target cell of the small base station apparatus 100 can be increased. In the example shown in FIG. 9(b), "$(\alpha+\beta)/A+\gamma/B$" which is the largest sum is adopted as the interference power. If weighting is not performed, $\alpha+\beta+\gamma$ becomes the interference power. On the other hand, as a result of weighting for the band of LTE, a value greater than $\alpha+\beta+\gamma$ becomes the interference power, and as a result, the transmission power becomes large.

In the above example, the weighting coefficient is set beforehand. Instead of that, the small base station apparatus 100 may receive, from a neighbor base station, information of the number of terminals (or traffic) connected to the neighbor base station by communication with the neighbor base station via the core network or by inter-base station communication, so that the transmission power determination unit 104 may determine the weighting coefficient based on the information of the number of terminals. The weighting coefficient is determined, for example, such that a value of received power corresponding to a neighbor base station in which the number of terminals (traffic) is large becomes large. For example, in the example of FIG. 9(a), in a case where the small base station apparatus 100 receives, from a plurality of LTE stations, information of a similarly large number of terminals, and receives, from a 3G station, information of a smaller number of terminals, for example, in the same way as the above-mentioned example, B is set to be 1, and A is set to be a value less than 1.

Also, it is possible to perform weighting according to frequency (bandwidth). For example, in the example of FIG. 9(a), for the purpose of obtaining high throughput, in order to cause mobile terminals existing in the LTE 15 MHz to move to the target cell of the small base station apparatus 100 as much as possible, weight of the divided band 3 is set to be small, so that interference is exaggerated when the neighbor 15 MHz base station exists. In the example shown in FIG. 9(c), Z is set to be small. For example, Z is set to be a value less than 1, X and Y are set to be a value larger than 1, such that $\beta/Z$ becomes the largest.

As mentioned above, in the modified example 2, the transmission power determination unit 104 weights the received power for each communication scheme of neighbor cells detected by the neighbor cell detection unit 102, calculates sums of weighted received powers for each band part, regards a largest value in sums of the weighted received powers to be the interference amount in the target cell, and determines the transmission power by using the interference amount. Also, the transmission power determination unit 104 may weight sums of received powers for each band part, regard a largest value in weighted sums of the received powers to be the interference amount in the target cell, and determine the transmission power by using the interference amount. Also, these may be combined.

As mentioned above, by adopting weighting, flexible target cell setting can be performed suitable for the purpose of placement of the small base station apparatus 100.

In the following, although a second embodiment and a third embodiment are described respectively, the second embodiment and the third embodiment may be combined and carried out.

(Second Embodiment)

First, a second embodiment is described. In the following, points different from the first embodiment are mainly described.

In the second embodiment, the small base station apparatus 100 sets a parameter for other-cell transition used by a mobile terminal as a value according to neighbor interference power, and notifies (broadcasts) the mobile terminal of the value. Accordingly, each mobile terminal can perform other-cell transition by using a proper parameter suitable for the transmission power that is determined by the small base station apparatus 100 by the method described so far.

Figure 10:
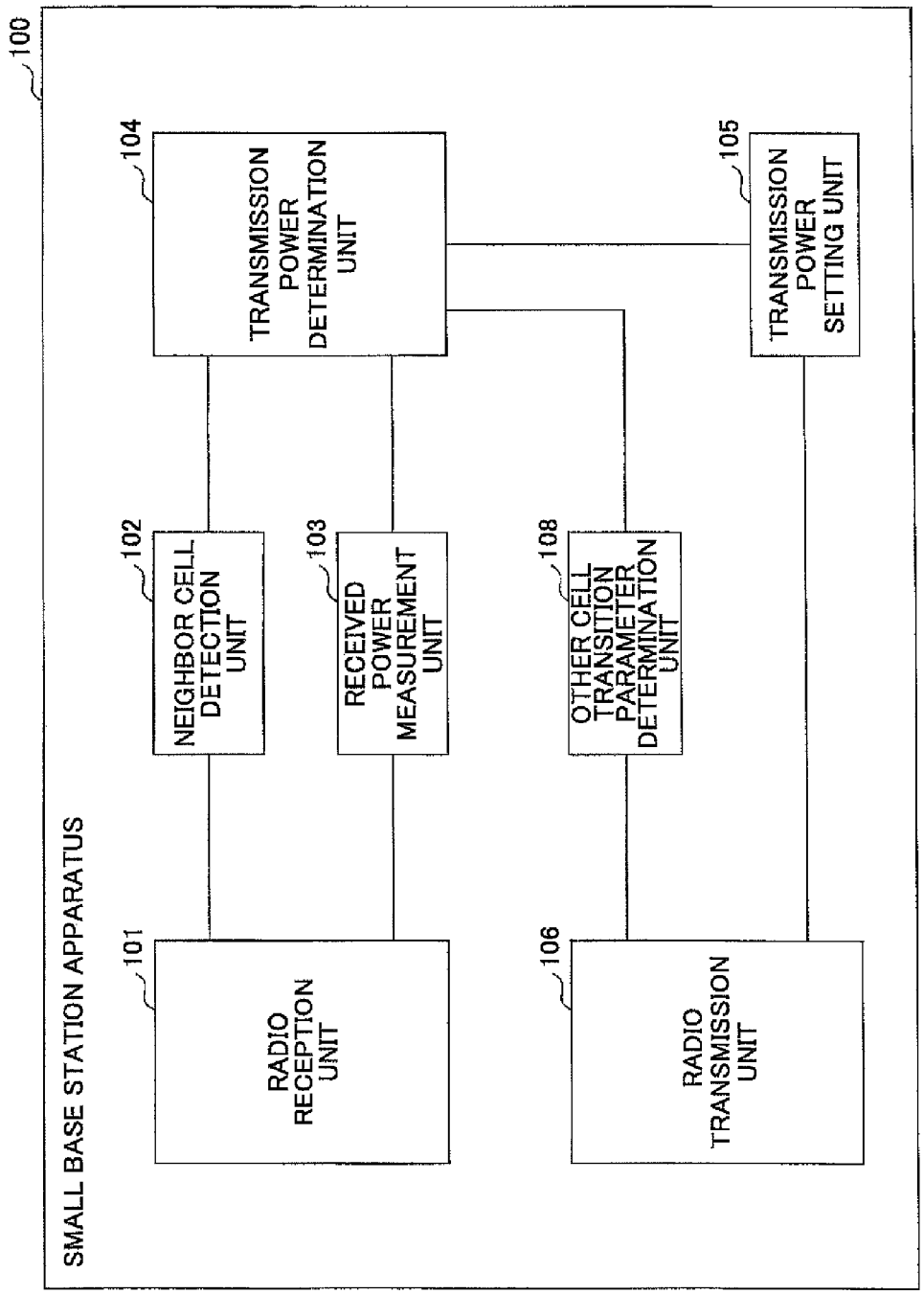
FIG. 10 is a functional block diagram of the small base station apparatus 100 in a second embodiment.

FIG. 10 shows a functional configuration of the small base station apparatus 100 of the present embodiment. As shown in FIG. 10, the configuration of the small base station apparatus 100 of the present embodiment is additionally provided with an other-cell transition parameter determination unit 108 to the configuration shown in FIG. 4.

The other-cell transition parameter determination unit 108 determines the other-cell transition parameter by adding a predetermined offset value, for example, to the interference power ($\alpha+\beta+\gamma$ in the example shown in FIG. 3) determined by the transmission power determination unit 104 in the processes described in the first embodiment (including modified examples). The determined parameter is, for example, broadcasted to mobile terminals as broadcast information (SIB and the like) by the radio transmission unit 106.

Figure 11:
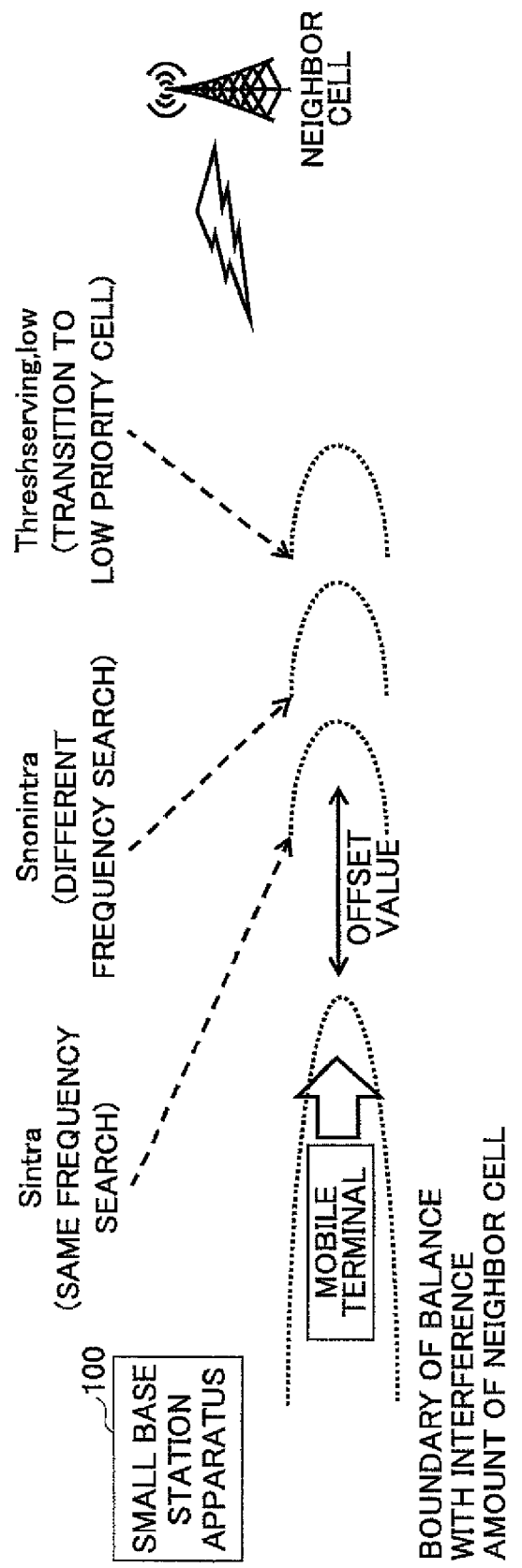
FIG. 11 is a diagram showing examples of other cell transmission parameter calculated and broadcasted in the second embodiment.

Examples of parameters determined by the other-cell transition parameter determination unit 108 are shown in FIG. 11. The content is described as follows. By the way, these are merely examples. Also, although these parameters are for LTE, the other-cell transition parameter can be calculated from the interference power similarly for 3G.

Sintra: Threshold based on which cell search for the same frequency as that of the residing cell is started when received power (received level) of the residing cell is less than this value.

Snonintra: Threshold based on which cell search for frequency different from that of the residing cell is started when received power of the residing cell is less than this value.

Thresh, serving, low: Threshold based on which cell search for cell of lower priority than that of the residing cell is started when received power of the residing cell is less than this value (example: threshold based on which cell search for 3G is started when LTE>3G in residing priority).

The other-cell transition parameter determination unit 108 determines Sintra by adding an offset value to an interference level calculated by the transmission power determination unit 104, determines Snonintra by subtracting a conversion offset value from Sintra, and determines Thresh serving, low by further subtracting a conversion offset value. The offset value and the conversion offset values are parameters that are predetermined and set (stored) in the other-cell transition parameter determination unit 108. Also, these parameters may be obtained from the outside (example: core network), and the obtained parameters may be used.

As mentioned above, in the present embodiment, other-cell transition parameter determination transmission means is provided, in which the other-cell transition parameter determination transmission means is configured to determine a parameter, based on the interference amount determined by the transmission power determination unit 104, that is used by a mobile terminal to perform other cell transition, and to transmit the parameter to the mobile terminal.

(Third Embodiment)

Next, the third embodiment is described. In the following, points different from the first embodiment are mainly described.

In embodiments described so far, transmission power is determined based on an interference power from the neighbor cell. In determining the transmission power, the transmission power may be determined by considering a path loss in a mobile terminal. For example, when a path loss reported from the mobile terminal is large, the transmission power of the small base station apparatus 100 is set to be large so as to improve reception quality in the residing mobile terminal.

However, in a case where path losses of all mobile terminals connected to the small base station apparatus 100 are used, it can be considered that the transmission power may be set for a very large path loss. In such a case, the small base station apparatus 100 may become an unnecessary interference source to neighbor cells. Therefore, in the present embodiment, mobile terminals for considering the path loss are narrowed. More specifically, path losses of only pre-registered mobile terminals are considered.

Figure 12:
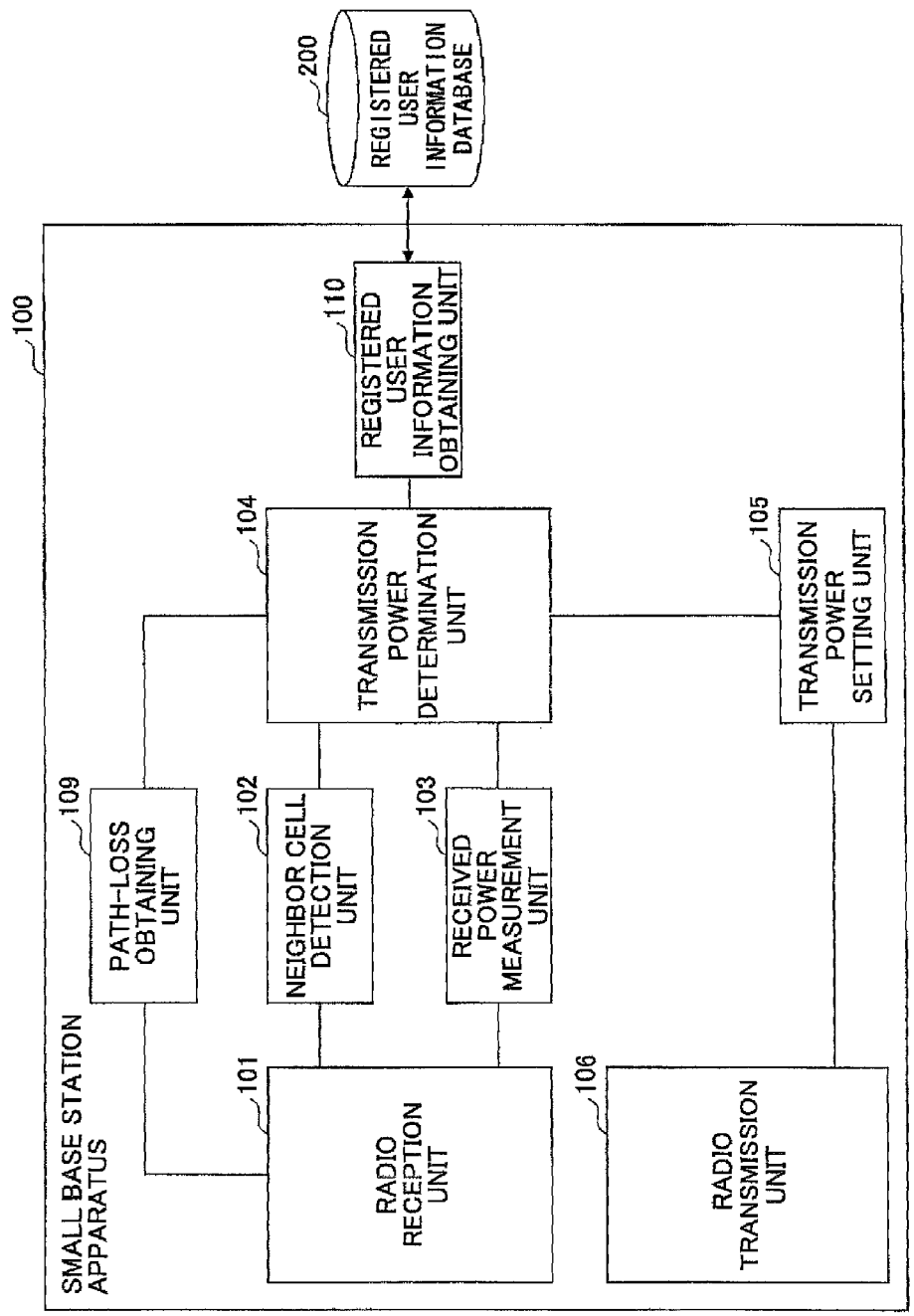
FIG. 12 is a functional block diagram of the small base station apparatus 100 in a third embodiment.

FIG. 12 shows a functional block diagram of the small base station apparatus 100 in the present embodiment. As shown in FIG. 12, the configuration is different from the small base station apparatus 100 shown in FIG. 4 in that a path loss obtaining unit 109 and a registered user information obtaining unit 110 are provided.

The radio reception unit 101 receives a report signal including downlink path loss that is measured by a mobile terminal connected to the small base station apparatus 100. The path loss obtaining unit 109 obtains the path loss and identification information of the mobile terminal, and passes them to the transmission power determination unit 104.

In the present embodiment, there is provided a registered user information database 200 (storage unit) that stores identification information of mobile terminals for which path loss is considered. The registered user information obtaining unit 110 obtains, from the registered user information database 200, via a network, identification information of mobile terminals for which path loss is considered, and passes the identification information to the transmission power determination unit 104.

The registered user information database 200 may be provided as an apparatus in the core network of the mobile communication network, for example. Also, the registered user information database 200 may be provided in the small base station apparatus 100. The identification information of mobile terminals for which path loss is considered is registered in the registered user information database 200, beforehand.

The mobile terminals for which path loss is considered are, for example, mobile terminals that can be used in a house (example: a home of a household) where the small base station apparatus 100 is placed.

In the present embodiment, after the transmission power determination unit 104 determines a transmission power based on an interference power as described so far, the transmission power determination unit 104 obtains path losses for mobile terminals for which path loss is considered from among path losses obtained by the path loss obtaining unit 109 based on information obtained by the registered user information obtaining unit 110. Then, the transmission power determination unit 104 adjusts the determined transmission power based on the largest (worst) path loss in the path losses of mobile terminals for which path loss is considered. For example, when the largest path loss is greater than a predetermined threshold, adjustment is performed such that the larger the path loss is, the larger the transmission power becomes. Also, when the largest path loss is less than a predetermined threshold, adjustment may be performed to decrease the determined transmission power.

As mentioned above, in the present embodiment, a path loss obtaining unit 109 configured to obtain a path loss of downlink from a mobile terminal connected to the radio base station apparatus 100 is provided, and the transmission power determination unit 104 adjusts the transmission power based on a path loss of a pre-registered mobile terminal from among path losses obtained by the path loss obtaining unit 109.

Accordingly, by considering path losses for only mobile terminals that are used in a predetermined area and that are registered, it becomes possible to construct an optimum area.

In the above, each embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the small base station apparatus 100 has been explained by using a functional block diagram. However, each apparatus may be implemented in hardware, software, or a combination thereof. The software that operates according to the present invention, that is, the software executed by a processor provided in the small base station apparatus 100 may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-160530, filed in the JPO on Aug. 1, 2013, and the entire contents of the Japanese patent application No. 2013-160530 are incorporated herein by reference.

DESCRIPTION OF REFERENCE SIGNS 100 small base station apparatus
1, 2, 3 macro base station apparatus
101 radio reception unit
102 neighbor cell detection unit
103 received power measurement unit
104 transmission power determination unit
105 transmission power setting unit
106 radio transmission unit
107 terminal state management unit
108 other-cell transition parameter determination unit
109 path loss obtaining unit
110 registered user information obtaining unit
200 registered user information database

The invention claimed is:

1. A radio base station apparatus including a function for determining a transmission power, comprising:
a neighbor cell detection circuit that detects a neighbor cell that interferes with a target cell that the radio base station apparatus can form;
a received power measurement circuit that measures, for each neighbor cell detected by the neighbor cell detection circuit, a received power from the neighbor cell; and
a transmission power determination circuit that calculates, for each band part that overlaps with a transmission band of the radio base station apparatus in transmission bands of each neighbor cell, a sum of received powers for neighbor cells having transmission bands each including the band part, and to determine an interference amount in the target cell based on the sum of received powers so as to determine the transmission power by using the interference amount.

2. The radio base station apparatus as claimed in claim 1, wherein the transmission power determination circuit regards the largest value in sums of received powers calculated for each band part to be the interference amount in the target cell, and determines the transmission power by using the interference amount.

3. The radio base station apparatus as claimed in claim 1, wherein the transmission power determination circuit obtains the number of terminals connected to the radio base station apparatus, and selects, based on the number of terminals, a value to be used as the interference amount in the target cell from among sums of received powers calculated for each band part so as to determine the transmission power by using the value.

4. The radio base station apparatus as claimed in claim 1, wherein the transmission power determination circuit weights the received power for each communication scheme of neighbor cells detected by the neighbor cell detection circuit, calculates sums of weighted received powers for each band part, regards the largest value in sums of the weighted received powers to be the interference amount in the target cell, and determines the transmission power by using the interference amount.

5. The radio base station apparatus as claimed in claim 1, wherein the transmission power determination circuit weights sums of received powers for each band part, regards the largest value in weighted sums of the received powers to be the interference amount in the target cell, and determines the transmission power by using the interference amount.

6. The radio base station apparatus as claimed in claim 1, wherein, when detecting the neighbor cell, the neighbor cell detection circuit searches a smaller number of measurement points than the number of measurement points where a center of a band of a neighbor cell may exist.

7. The radio base station apparatus as claimed in claim 1, comprising:

an other-cell transition parameter determination transmission circuit that determines a parameter, based on the interference amount determined by the transmission power determination circuit, that is used by a mobile terminal to perform other cell transition, and to transmit the parameter to the mobile terminal.

8. The radio base station apparatus as claimed in claim 1, comprising:
a path loss obtaining circuit that obtains a path loss of downlink from a mobile terminal connected to the radio base station apparatus,
wherein the transmission power determination circuit adjusts the transmission power based on a path loss of a pre-registered mobile terminal from among path losses obtained by the path loss obtaining circuit.

9. A transmission power determination method executed by a radio base station apparatus, comprising:
a neighbor cell detection step of detecting a neighbor cell that interferes with a target cell that the radio base station apparatus can form;
a received power measurement step of measuring, for each neighbor cell detected by the neighbor cell detection step, a received power from the neighbor cell; and
a transmission power determination step of calculating, for each band part that overlaps with a transmission band of the radio base station apparatus in transmission bands of each neighbor cell, a sum of received powers for neighbor cells having transmission bands each including the band part, and determining an interference amount in the target cell based on the sum of received powers so as to determine the transmission power by using the interference amount.

10. The transmission power determination method as claimed in claim 9, wherein, in the transmission power determination step, the radio base station apparatus regards the largest value in sums of received powers calculated for each band part to be the interference amount in the target cell, and determines the transmission power by using the interference amount.

* * * * *